United States Patent [19]

Matsuda et al.

[11] Patent Number: 5,653,427
[45] Date of Patent: Aug. 5, 1997

[54] LIQUID FILLED TYPE VIBRATION ISOLATING DEVICE

[75] Inventors: Akinori Matsuda; Kazunori Yoshida; Hideo Nakai; Shigeki Takeo; Takashi Maeno, all of Aichi-ken, Japan

[73] Assignees: Kabushiki Kaisha Toyota Chuo Kenkyusho; Toyoda Gosei Co., Ltd., both of Aichi-ken, Japan

[21] Appl. No.: 622,373

[22] Filed: Mar. 27, 1996

[30] Foreign Application Priority Data

Mar. 31, 1995 [JP] Japan ................................. 7-076617

[51] Int. Cl.$^6$ ................................. F16F 9/08; F16M 1/00
[52] U.S. Cl. ................................. 267/140.14; 267/140.15; 267/219
[58] Field of Search ................................. 248/562, 636, 248/35, 122; 267/219, 140.11, 140.12, 140.13, 140.14, 140.15; 188/297, 298, 311, 312, 313, 316, 317

[56] References Cited

U.S. PATENT DOCUMENTS

| | | | |
|---|---|---|---|
| 4,779,585 | 10/1988 | Behrens et al. | 267/140.1 |
| 5,037,071 | 8/1991 | Takano et al. | 267/140.1 |
| 5,092,566 | 3/1992 | Freudenberg | 267/140.1 |
| 5,297,781 | 3/1994 | Gennesseaux | 267/140.1 |
| 5,356,123 | 10/1994 | Hamada et al. | 267/140.14 |
| 5,439,204 | 8/1995 | Yamazoe et al. | 267/140.14 |
| 5,516,084 | 5/1996 | Rizzo | 267/140.13 |

FOREIGN PATENT DOCUMENTS

| | | |
|---|---|---|
| 60-8540 | 1/1985 | Japan . |
| 4-312229 | 11/1992 | Japan . |

*Primary Examiner*—Hezron E. Williams
*Assistant Examiner*—Rose M. Miller
*Attorney, Agent, or Firm*—Oblon, Spivak, McClelland, Maier & Neustadt, P.C.

[57] ABSTRACT

In a vibration isolating device, a main chamber has a part of a wall constituted by a first elastic member to be deformed by input vibration and is filled with liquid, and a sub chamber has a part of a wall constituted by a second elastic member and is filled with liquid, and the main chamber communicates with the sub chamber through a main flow path. A liquid pressure adjusting plate is installed within the main chamber and divides the main chamber into a first chamber and a second chamber and vibrates in an opposite phase to that of the input vibration. The first chamber communicates with the second chamber through a sub flow path and the dimensions of the sub flow path is set so that the sub flow path is choked during high frequency vibration of the liquid pressure adjusting plate.

15 Claims, 9 Drawing Sheets

F I G. 9
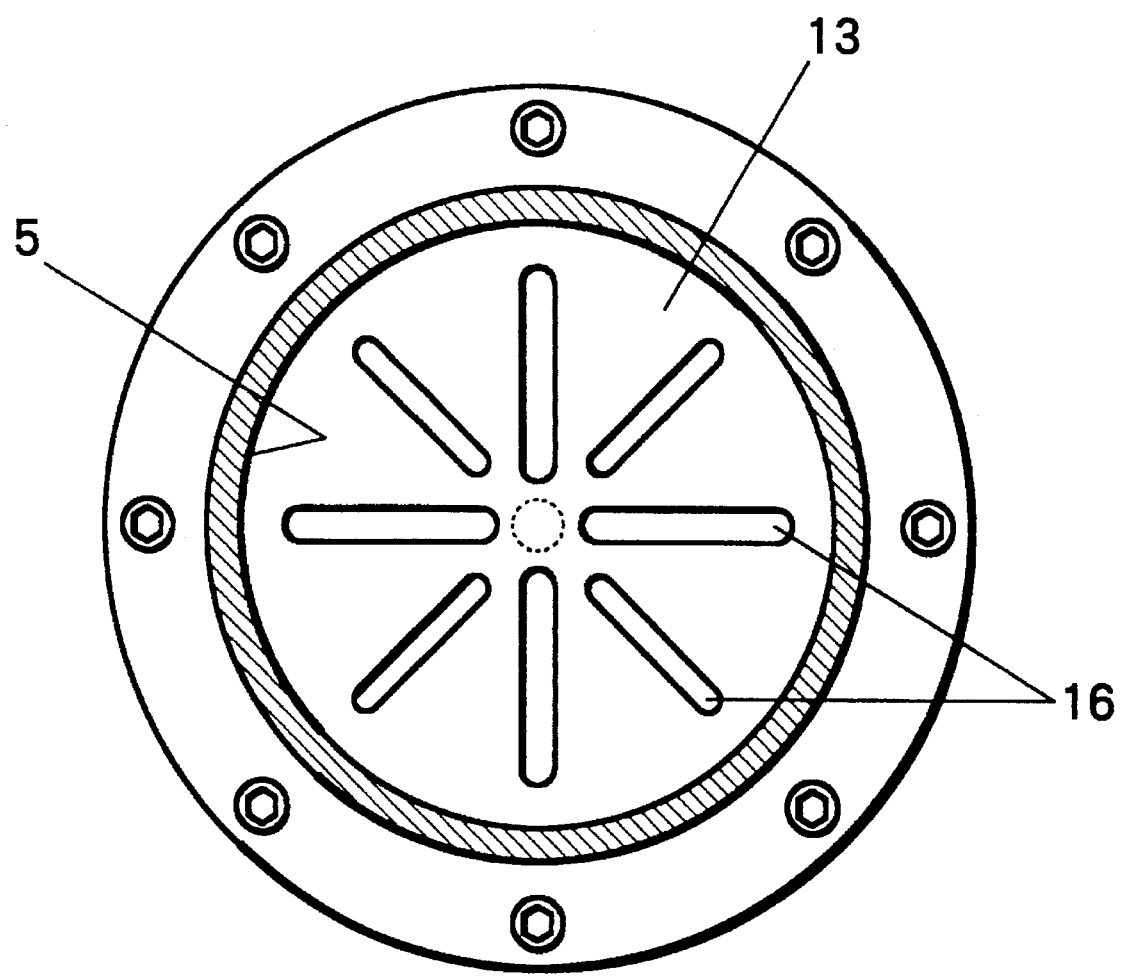

LIQUID FILLED TYPE VIBRATION ISOLATING DEVICE

BACKGROUND OF THE INVENTION

1. Field of the Invention

The present invention relates to a liquid filled type vibration isolating device to be used for an engine mount of an automobile or the like.

2. Prior Art

In such a liquid filled type vibration isolating device as disclosed in JP-A 60-8540, a part of a wall of a liquid chamber is constituted by a first elastic wall to be deformed by the input vibration and a vibration plate vibrating in the opposite phase to that of the input vibration, and a part of a wall of a sub chamber is constituted by the above-mentioned vibration plate and a second elastic wall, and liquid is filled in the liquid chamber and the sub chamber.

In such a vibration isolating device, even at low frequency of the input vibration, liquid pressure of the liquid chamber acts on one surface of the vibration plate, and when the vibration of large amplitude is inputted, the liquid pressure of the liquid chamber becomes high or low and large force acts on one surface of the vibration plate. In order to vibrate the vibration plate against the large force by an actuator such as a solenoid, the strength of the vibration plate and the drive force of the actuator must be raised. If this necessity is satisfied, the vibration isolating device is increased in size, weight and power consumption, and therefore becomes large scale. Consequently, such a vibration isolating device can not be easily put into practice.

SUMMARY OF THE INVENTION

An object of the present invention is to provide a liquid filled type vibration isolating device where a liquid pressure adjusting plate need not be vibrated when the input vibration is of low frequency, and even when the vibration of large amplitude is inputted, large force does not act on the liquid pressure adjusting plate.

In a liquid filled type vibration isolating device in the present invention, a part of a wall of a main chamber is constituted by a first elastic member to be deformed by input vibration, and a part of a wall of a sub chamber is constituted by a second elastic member, and the main chamber communicates with the sub chamber through a main flow path, and liquid is filled in the main chamber and the sub chamber, and a liquid pressure adjusting plate vibrating in the opposite phase to that of the input vibration is installed within the main chamber, and the main chamber is divided by the liquid pressure adjusting plate into a first chamber and a second chamber, and a sub flow path through which the first chamber communicates with the second chamber is provided in such dimensions that the sub flow path is choked during the high frequency vibration of the liquid pressure adjusting plate.

In the present invention, when the input vibration is of low frequency, liquid corresponding to the volume variation of the main chamber due to the deformation of the first elastic member flows reciprocally between the main chamber and the sub chamber through the main flow path, and the input vibration is damped by the resonance of the liquid.

Even if the liquid pressure adjusting plate is vibrated in the opposite phase to that of the input vibration of low frequency, the speed of the liquid flowing through the sub flow path between the first chamber and the second chamber is low and the flow resistance of the sub flow path is small, and the liquid pressure in the first chamber and the second chamber, that is, the liquid pressure acting on both surfaces of the liquid pressure adjusting plate is nearly the same. Consequently, when the input vibration is of low frequency, even if the liquid pressure adjusting plate is vibrated, the vibration isolating effect is not affected, and the liquid pressure adjusting plate need not be vibrated. Even if vibration of large amplitude is inputted, large force does not act on the liquid pressure adjusting plate.

When the input vibration is of high frequency, the speed of the liquid flowing through the main flow path between the main chamber and the sub chamber becomes high and the flow resistance of the main flow path becomes large, so that the main flow path is choked. Also the liquid pressure adjusting plate is vibrated in the opposite phase to that of the input vibration of high frequency, and the speed of the liquid flowing through the sub flow path between the first chamber and the second chamber becomes high and the flow resistance of the sub flow path becomes large, so that the sub flow path is choked. Each liquid in the first chamber and the second chamber is in the sealed state, and the input vibration is damped by the vibration of the liquid pressure adjusting plate in the opposite phase to that of the input vibration.

In the present invention, since the liquid pressure adjusting plate need not be vibrated when the input vibration is of low frequency, and also since large force does not act on the liquid pressure adjusting plate even if vibration of large amplitude is inputted, being different from the prior art, the strength and drive force of the liquid pressure adjusting plate need not be raised and thus the device does not become large size.

BRIEF DESCRIPTION OF THE DRAWINGS

FIG. 9 is a sectional view taken in line IX—IX in FIG. 8;

DETAILED DESCRIPTION OF PREFERRED EMBODIMENTS

First Embodiment (FIG. 1–FIG. 7)

A liquid filled type vibration isolating device in this embodiment is an engine mount of an automobile.

[Constitution]

Figure 1:
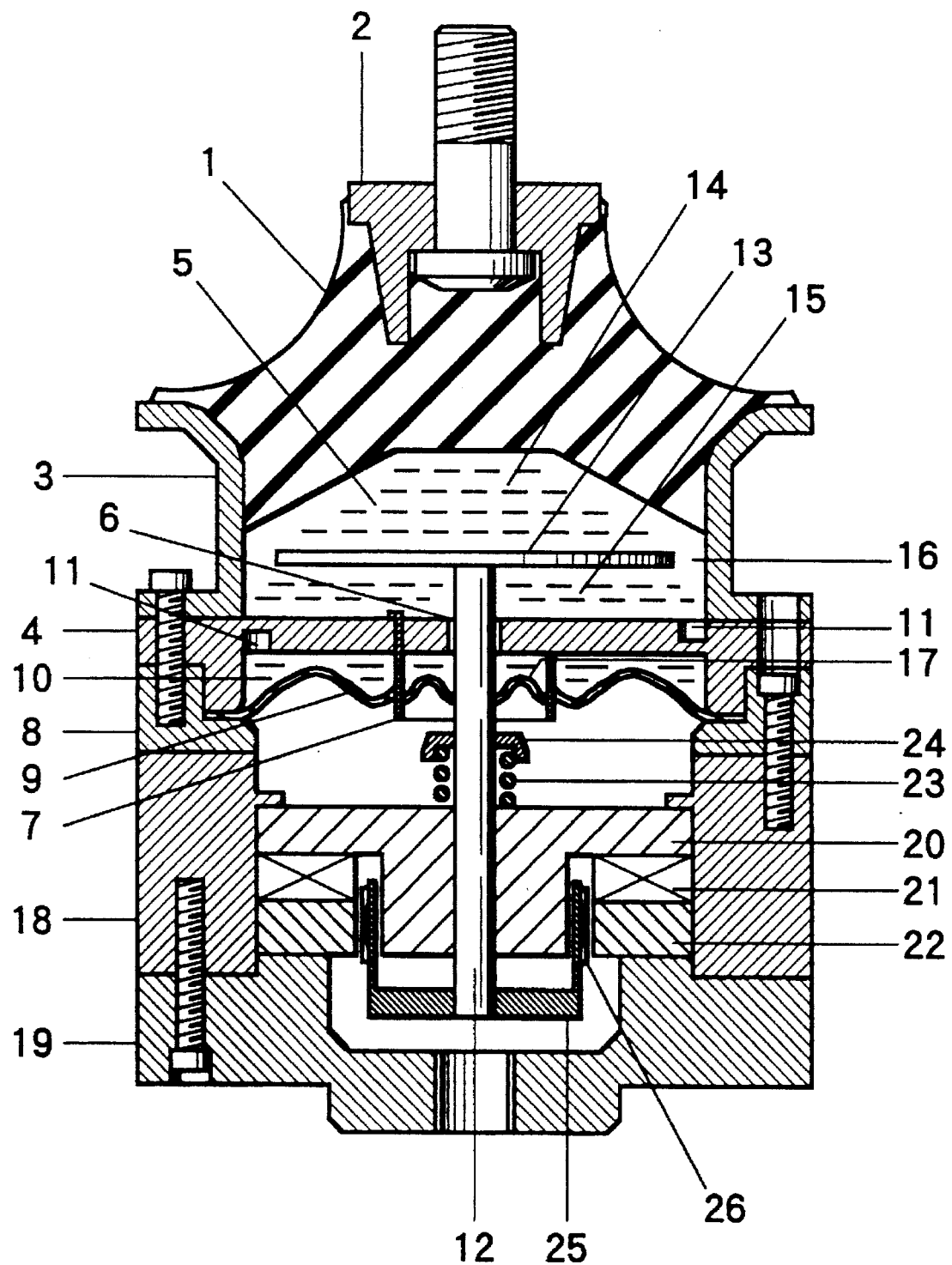
FIG. 1 is a longitudinal sectional front view of a liquid filled type vibration isolating device in a first embodiment of the invention.

As shown in FIG. 1, an engine mounting member 2 with a bolt is fixed to a top portion of a first elastic member 1 of synthetic rubber in a nearly conical shape, an upper portion of a frame 3 in a cylindrical shape is fixed to a lower portion of the first elastic member 1, and a partition plate 4 in disk shape is fixed to a lower portion of the frame 3. The first elastic member 1, the frame 3 and the partition plate 4 constitute a main chamber 5.

At a lower surface of the partition plate 4, as shown in FIG. 1, a cylinder 7 is fixed surrounding a center hole 6 of the partition plate 4 and an annular member 8 is fixed to a lower surface of a peripheral portion of the partition plate 4. An outer circumferential portion of a second elastic member 9 of synthetic rubber in a curved annular membrane shape is held and fixed between the peripheral portion of the partition plate 4 and the annular member 8, and an inner circumferential portion of the second elastic member 9 is fixed to an outer circumferential surface of the cylinder 7. The partition plate 4, the cylindrical member 7 and the second elastic member 9 constitute a sub chamber 10.

As shown in FIG. 1, a main flow path 11 penetrates the partition plate 4 circularly between the upper and lower surfaces of the partition plate 4, and the main chamber 5 communicates with the sub chamber 10 through the main flow path 11. Liquid such as antifreeze is filled in the main chamber 5, the sub chamber 10 and the main flow path 11.

At the center hole 6 of the partition plate 4, as shown in FIG. 1, a shaft 12 is inserted in a vertical direction and a liquid pressure adjusting plate 13 in a disk shape is fixed concentrically on the upper end of the shaft 12 projected within the main chamber 5. The upper surface of the liquid pressure adjusting plate 13 faces the first elastic member 1 and the lower surface of the liquid pressure adjusting plate 13 faces the partition plate 4. The main chamber 5 is divided into two chambers, i.e., a first chamber 14 and a second chamber 15, by the liquid pressure adjusting plate 13 being parallel to the partition plate 4. The first chamber 14 is constituted by the first elastic member 1, the frame 3 and the liquid pressure adjusting plate 13, and the second chamber 15 is constituted by the liquid pressure adjusting plate 13, the frame 3 and the partition plate 4.

The liquid pressure adjusting plate 13, as shown in FIG. 1, has a diameter smaller than the inner diameter of the frame 3 in a cylindrical shape, and a gap between the liquid pressure adjusting plate 13 and the frame 3 in a concentric shape forms a sub flow path 16 in an annular shape and the first chamber 14 communicates with the second chamber 15 through the sub flow path 16.

Regarding dimensions of the sub flow path 16, when the inner diameter of the main chamber 5, i.e., the inner diameter of the frame 3 is about 60–80 mm, the diameter of the liquid pressure adjusting plate 13 is set to about 76–95% of the inner diameter of the frame 3. The sub flow path 16 with such dimensions is choked when the liquid pressure adjusting plate 13 is vibrated up and down at high frequency of 100 Hz or more.

The shaft 12 of the liquid pressure adjusting plate 13 as shown in FIG. 1, penetrates the center hole 6 of the partition plate 4 and the cylinder 7 in a non-contact state, and a third elastic member 17 of synthetic rubber in a curved annular membrane shape is fixed between the shaft 12 and the inner circumferential surface of the cylinder 7 so that the leakage of liquid is prevented.

As shown in FIG. 1, a cylindrical member 18 is fixed to a lower surface of the annular member 8, and a body mounting member 19 in a disk shape with a bolt hole is fixed to a lower surface of the cylindrical member 18. When the engine mounting member 2 or the body mounting member 19 is vibrated up and down and the vertical distance between the engine mounting member 2 and the body mounting member 19 is increased or decreased, the first elastic member 1 is deformed and the volume of the first chamber 14 of the main chamber 5 is increased or decreased.

To the cylindrical member 18, as shown in FIG. 1, a first yoke 20 having a smaller diameter and a larger diameter, a permanent magnet 21 in an annular plate shape and a second yoke 22 in an annular plate shape are fitted and fixed in sequence, and the permanent magnet 21 is held between the larger diameter part of the first yoke 20 and the second yoke 22. The lower part of the shaft 12 of the liquid pressure adjusting plate 13 penetrates the center hole of the first yoke 20. A helical spring 23 penetrated by the shaft 12 is fitted between a receiving ring 24 fixed to the shaft 12 and the first yoke 20, thereby the liquid pressure adjusting plate 13 and the shaft 12 are supported.

The shaft 12 of the liquid pressure adjusting plate 13, as shown in FIG. 1, has its lower end projected from the lower surface of the smaller diameter part of the first yoke 20. A bobbin 25 in a cup shape is fitted to the smaller diameter part of the first yoke 20 in a non-contact state, and the lower end of the shaft 12 is fixed to a bottom plate of the bobbin 25. A coil 26 is wound around an outer circumference of the bobbin 25 and is fitted to the center holes of the permanent magnet 21 and the second yoke 22 in a non-contact state.

The first yoke 20, the permanent magnet 21, the second yoke 22, the bobbin 25 and the coil 26 constitute an actuator vibrating the liquid pressure adjusting plate 13.

When high frequency current is supplied to the coil 26 of the actuator, the movable parts, that is, the liquid pressure adjusting plate 13, the shaft 12, the bobbin 25, the coil 26 and the receiving ring 24, are vibrated as one body up and down at high frequency.

The second elastic member 9, the annular member 8, the cylindrical member 18 and the first yoke 20 constitute an air chamber.

Figure 2:
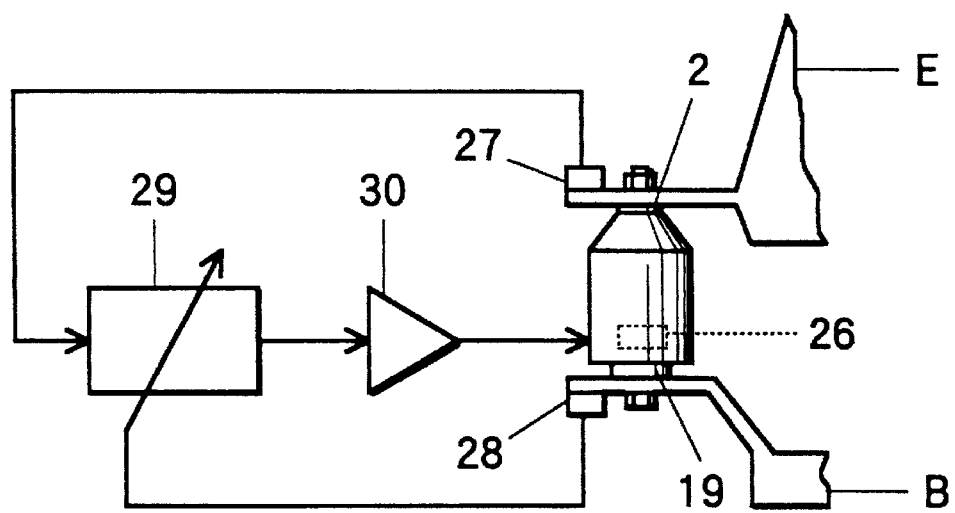
FIG. 2 is a schematic diagram of a control device of a liquid pressure adjusting plate vibration actuator of the vibration isolating device.

A control device for the actuator is constructed as shown in FIG. 2. Vibrometers 27 and 28 are mounted on a bracket of an engine E to be fixed to the engine mounting member 2 and on a bracket of a body B to be fixed to the body mounting member 19, respectively. The vibrometer 27 at the engine side is connected to an input terminal of an adaptive filter controller 29, and the vibrometer 28 at the body side is connected to an error terminal of the adaptive filter controller 29. An output terminal of the adaptive filter controller 29 is connected through an amplifier 30 to the coil 26.

The adaptive filter controller 29 controls high frequency currents to be supplied to the coil 26 according to the vibration of high frequency detected by both vibrometers 27 and 28, vibrates the liquid pressure adjusting plate 13 in the opposite phase to that of the input vibration of high frequency detected by the vibrometer 27 at the engine side, and minimizes the amplitude of the output vibration detected by the vibrometer 28 at the body side.

[Functions]

When the engine E vibrates at frequency due to idle running, engine shake or the like and the input vibration is of low frequency, the coil 26 of the actuator is not energized and the liquid pressure adjusting plate 13 is not vibrated. The first elastic member 1 is vibrated and deformed by the input vibration of low frequency, and liquid corresponding to the volume variation of the main chamber 5 due to the deformation of the first elastic member 1 flows reciprocally between the main chamber 5 and the sub chamber 10 through the main flow path 11, and the input vibration is damped by the resonance of the liquid. The dimensions of the main flow path 11 are set to a value so that the damping effect becomes high when the input vibration is of low frequency of about 5–30 Hz.

When the first elastic member 1 is deformed by the input vibration of low frequency, liquid of the main chamber 5 flows through the sub flow path 16 between the first chamber 14 and the second chamber 15. In this case, since the dimensions of the sub flow path 16 are set to the above-mentioned value, the speed of the liquid flowing through the sub flow path 16 is low and there is little flow resistance of the sub flow path 16. The liquid pressures acting on both surfaces of the liquid pressure adjusting plate 13 are almost the same. The diameter of the shaft 12 is very small relative to the diameter of the liquid pressure adjusting plate 13. The pressure receiving area on both surfaces of the liquid pressure adjusting plate 13 is nearly the same. Consequently, the liquid pressure adjusting plate 13 is not subjected to force and remains static.

When the input vibration of low frequency has quite a large amplitude and the liquid pressure of the main chamber 5 becomes quite large, since the pressure receiving area at the lower surface of the liquid pressure adjusting plate 13 is smaller than that at the upper surface by the sectional area of the shaft 12, the liquid pressure adjusting plate 13 is subjected to the pushing-down force and goes down against the helical spring 23. When the pushing-down force by the liquid pressure balances with the pushing-up force by the helical spring 23, the liquid pressure adjusting plate 13 stops moving.

When the engine E runs at high speed and the input vibration is of high frequency, the speed of the liquid flowing through the main flow path 11 between the main chamber 5 and the sub chamber 10 becomes higher to increase the flow resistance of the main flow path 11. The main flow path 11 is choked.

When the input vibration is of high frequency, the liquid pressure adjusting plate 13 is vibrated in the opposite phase to that of the input vibration of high frequency by the actuator and its control device. With the input vibration of high frequency, the speed of the liquid flowing through the sub flow path 16 between the first chamber 14 and the second chamber 15 becomes higher to increase the flow resistance of the sub flow path 16. When the input vibration is of high frequency of 100 Hz or more, since the sub flow path 16 has been set to the above-mentioned value, the sub flow path 16 is choked and each liquid in the first chamber 14 and the second chamber 15 becomes in a sealed state respectively. The input vibration is damped or canceled by the vibration of the liquid pressure adjusting plate 13 in the opposite phase to that of the input vibration.

When the liquid pressure adjusting plate 13 is vibrated in the opposite phase to that of the input vibration, since the liquid flowing through the sub flow path 16 and the liquid pressure adjusting plate 13 are moved in reverse directions, the relative speed between both becomes high and the flow resistance of the sub flow path 16 becomes large, so that the lowest frequency to choke the sub flow path 16 becomes lower than that when the liquid pressure adjusting plate 13 is not vibrated in the opposite phase to that of the input vibration.

[Effects]

The vibration with a frequency of 0–500 Hz was applied to the engine mounting member 2 by a hydraulic vibrator, and the force transferred to the body mounting member 19 was measured for cases where the liquid pressure adjusting plate 13 was and was not subjected to vibration control. The measured results are shown in FIG. 3 as a diagram showing the relation between the transfer force [dB] to the body mounting member 19 and the frequency [Hz] of the input vibration to the engine mounting member 2, where the transfer force 0 dB is 1 kgf.

Figure 3:
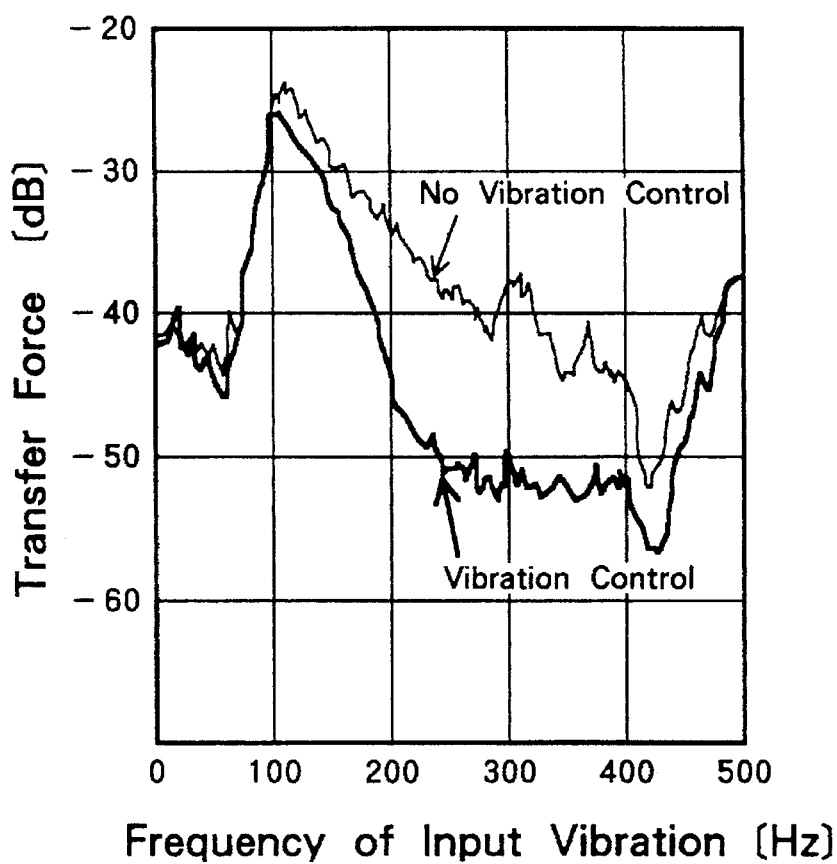
FIG. 3 is a diagram showing the relation between the transfer force and the frequency of input vibration in the vibration isolating device.

As is clearly seen from FIG. 3, when the input vibration to the engine mounting member 2 is of high frequency of 100–500 Hz, the transfer force to the body mounting member 19 becomes small and the damping effect becomes high in the case that the liquid pressure adjusting plate 13 is subjected to vibration control in comparison to the case that it is not subjected to vibration control.

[Vibration Analysis, Determination of Dimensions of Sub Flow Path 16]

Figure 4:
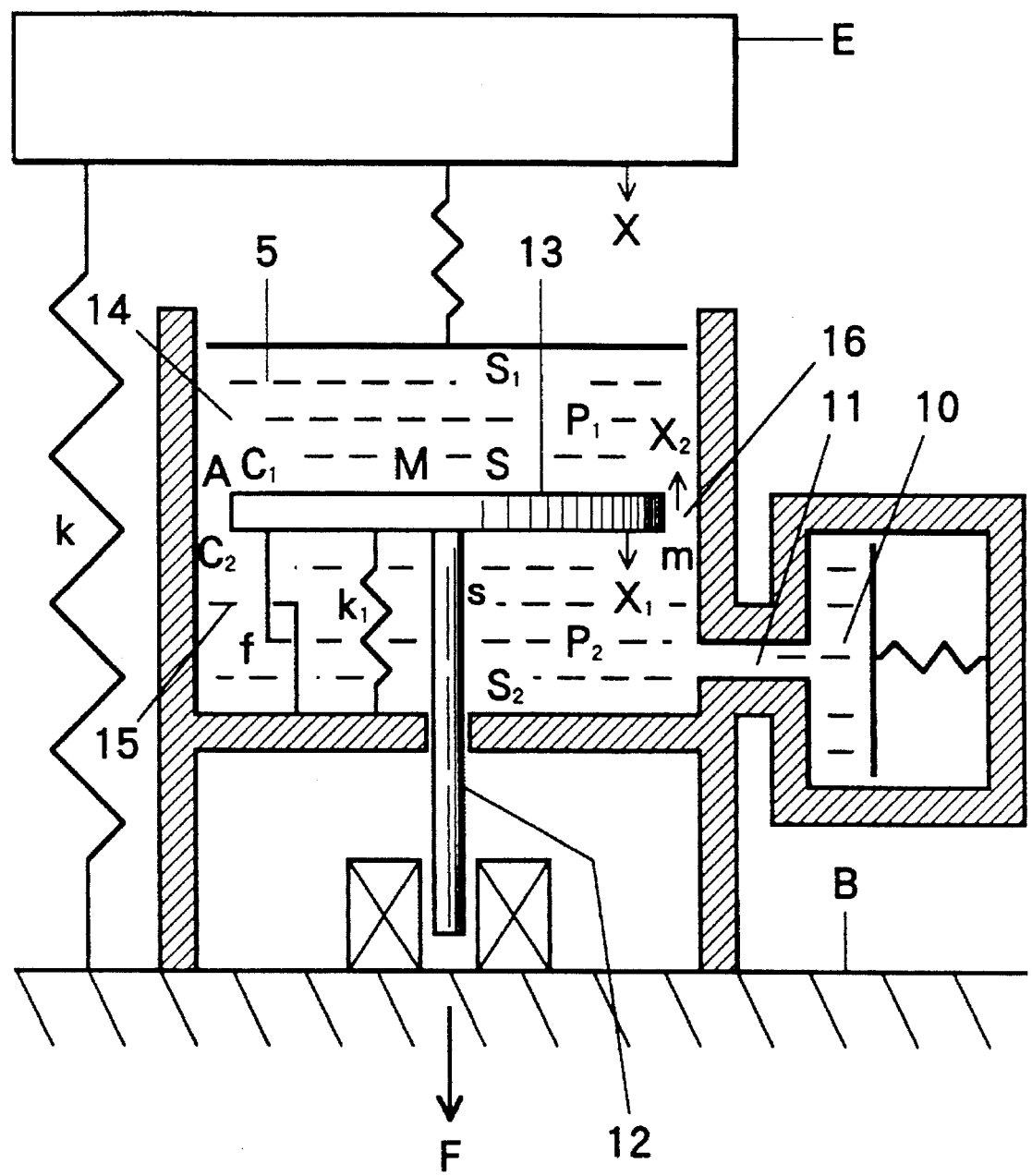
FIG. 4 is a diagram of a dynamic model of the vibration isolating device.

The dynamic model of the vibration isolating device in this embodiment is shown in FIG. 4. The following notation is used:

X: disturbance displacement to be inputted to the engine E $X_1$: displacement of the movable parts such as the liquid pressure adjusting plate 13

$X_2$: displacement of liquid in the sub flow path 16

F: transfer force to the body B f: drive force of the movable parts such as the liquid pressure adjusting plate 13 k: main spring constant $k_1$: support spring constant of the movable parts such as the liquid pressure adjusting plate 13

$P_1$: pressure of the first chamber 14

$P_2$: pressure of the second chamber 15

A: sectional area of the sub flow path 16

S: area of the upper or lower surface of the liquid pressure adjusting plate 13 s: sectional area of the shaft 12

$S_1$: pressure receiving area of the first elastic member 1

$S_2$: pressure receiving area of the second chamber 15

M: mass of the movable parts such as the liquid pressure adjusting plate 13 m: mass of liquid in the sub flow path 16

$C_1$: viscous damping coefficient between liquid in the sub flow path 16 and the liquid pressure adjusting plate 13

$C_2$: viscous damping coefficient between liquid in the sub flow path 16 and the circumferential wall of the main chamber 5

In the case that disturbance displacement X is inputted to the engine E and the movable parts such as the liquid pressure adjusting plate 13 are driven by drive force f, and force F is transferred to the body B, the equation of motion of the movable parts is given by $$MD^2X_1 = -k_1X_1 - f + (P_1 - P_2)S + P_2s - C_1(DX_1 + DX_2)$$

where D denotes a differentiation with respect to time.

The equation of motion of liquid flowing through the sub flow path 16 is written in the form $$mD^2X_2 = (P_1 - P_2)A - C_1(DX_1 + DX_2) - C_2DX_2$$

The transfer force F to the body B is expressed in the form $$F=kX+P_1S_1+(P_2-P_1)S_2-P_2s+C_2DX_2+k_1X_1+f$$

These differential equations with respect to time are transformed by the Laplace transformation and made simultaneous equations together with an equation of continuity of liquid, a characteristic equation of spring and so forth, thereby to obtain the relation of the transfer force F, the disturbance displacement X and the drive force f as follows:

$$F=G_1(j\omega)X+G_2(j\omega)f$$

where $G_1$ ($j\omega$) and $G_2$ ($j\omega$) are transfer functions and functions of frequency $\omega$, and $j^2=-1$.

Figure 5:
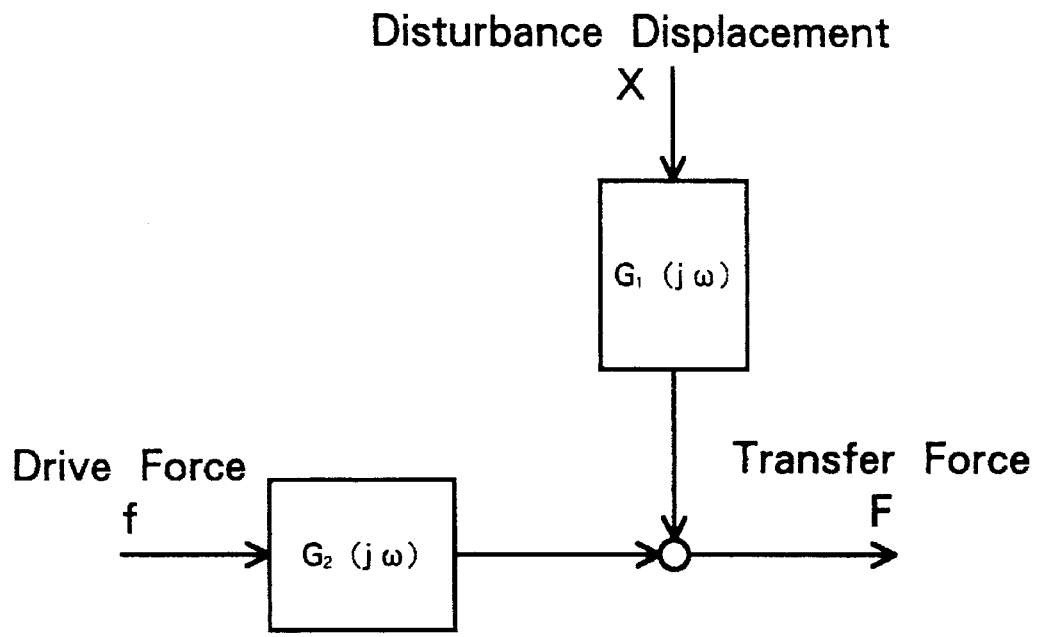
FIG. 5 is a transfer block diagram of the dynamic model.

The above-mentioned relation is shown as a transfer block diagram in FIG. 5, and means that the transfer force F becomes small when the disturbance force $G_1$ ($j\omega$) X is decreased by the suppression force $G_2$ ($j\omega$) f.

The transfer function $G_2$ ($j\omega$) expresses the flow resistance of the sub flow path 16 as a function of frequency $\omega$ of the input vibration. At the input vibration with high frequency region of 100 Hz or more where the liquid pressure adjusting plate 13 is subjected to vibration control, the transfer function $G_2$ ($j\omega$) is set to a large value so as to cancel the disturbance force. Whereas at the input vibration with low frequency region of 30 Hz or less where the liquid pressure adjusting plate 13 is not subjected to vibration control, the transfer function $G_2$ ($j\omega$) is set to a small value so that the flow resistance of the sub flow path 16 does not badly affect the damping effect of the low frequency vibration.

Figure 6:
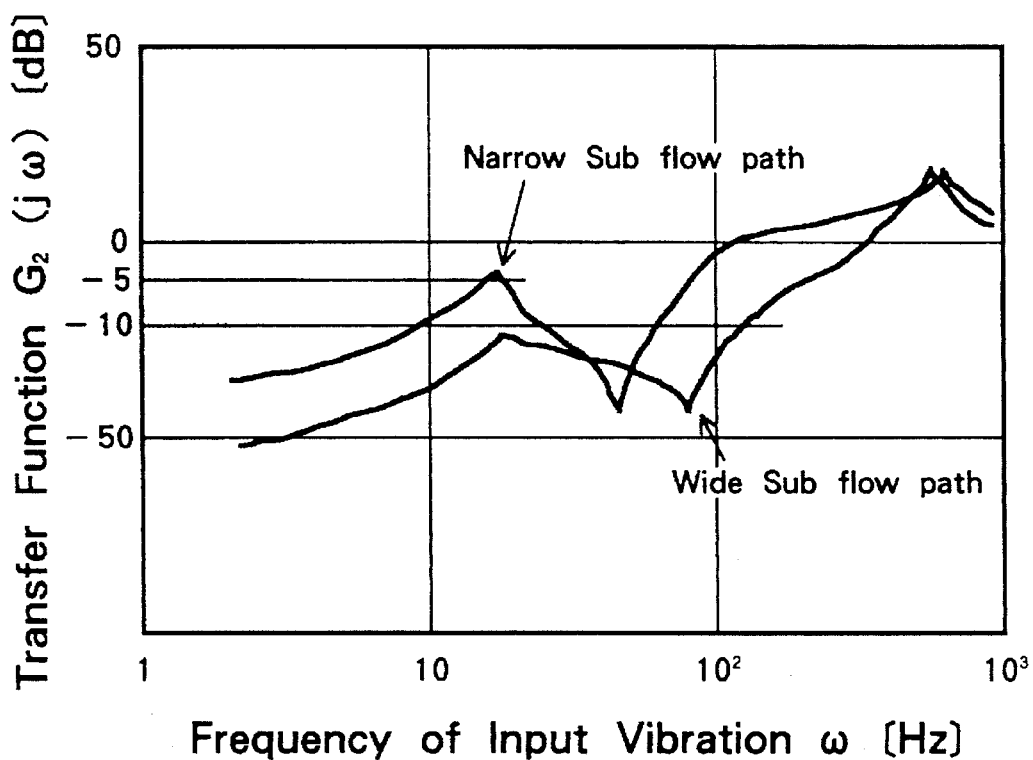
FIG. 6 is a diagram exemplifying the relation between the value of transfer function and the frequency of input vibration in the dynamic model when a sub flow path is narrow and wide.

FIG. 6 exemplifies the relation between the value of transfer function $G_2$ ($j\omega$) and frequency $\omega$ of the input vibration when the diameter of the liquid pressure adjusting plate 13 is large and the width of the sub flow path 16 is narrow and when the diameter of the liquid pressure adjusting plate 13 is small and the width of the sub flow path 16 is wide. As is clearly seen from FIG. 6, when the width of the sub flow path 16 becomes narrow, the value of transfer function $G_2$ ($j\omega$) rises not only at high frequency region of 100 Hz or more but also at low frequency region of 30 Hz or less.

Therefore, such a width of the sub flow path 16 should preferably be such that the value of transfer function $G_2$ ($j\omega$) is −5 dB or less at low frequency of 5–30 Hz and −10 dB or more at high frequency of 100–500 Hz.

Figure 7:
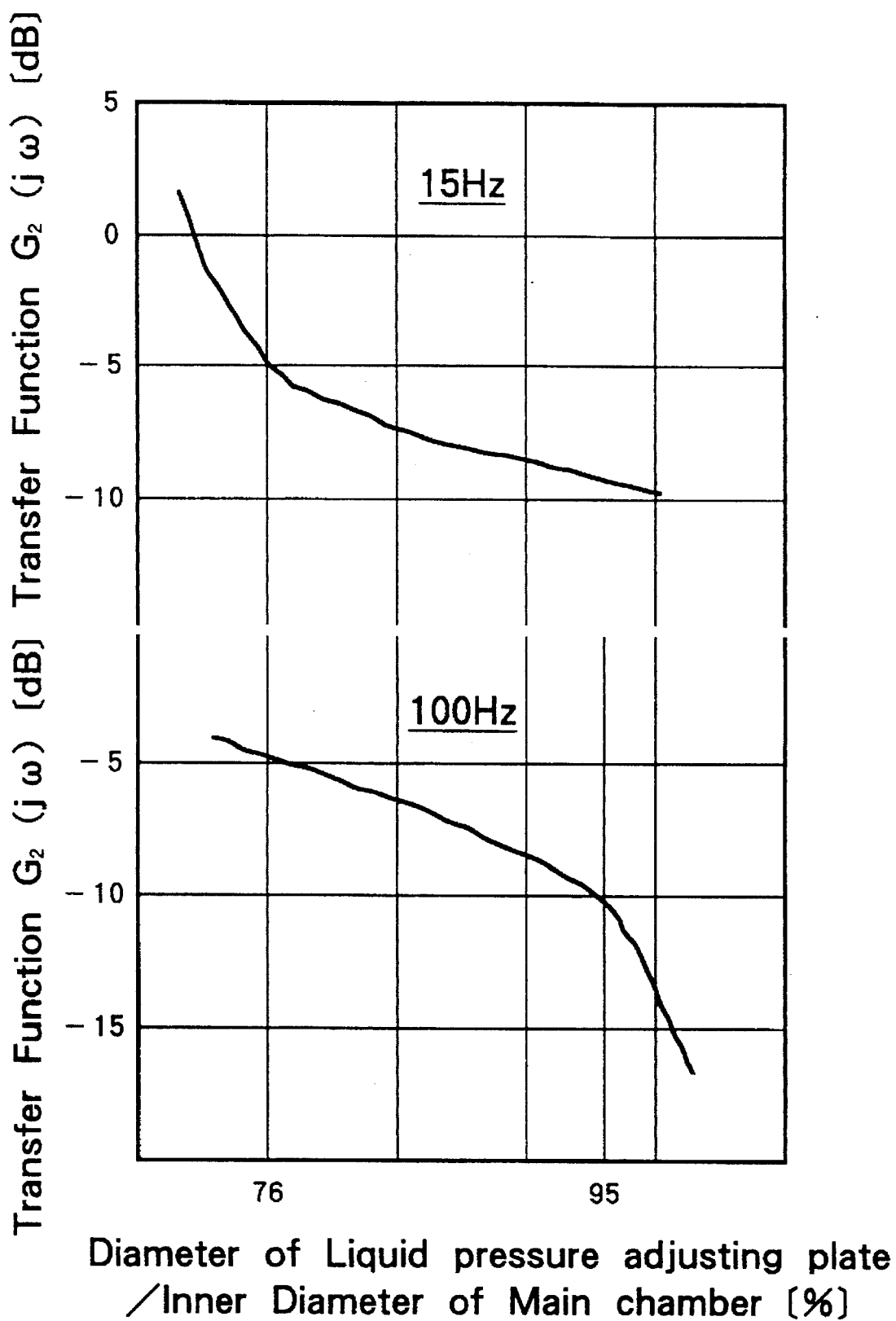
FIG. 7 is a diagram showing the relation between the value of transfer function and the ratio of a diameter of a liquid pressure adjusting plate to an inner diameter of a main chamber in the dynamic model when input vibration is 15 Hz and 100 Hz.

FIG. 7 shows the relation between the value of transfer function $G_2$ ($j\omega$) and the ratio of the diameter of the liquid pressure adjusting plate 13 to the inner diameter of the main chamber 5 when the input vibration is at low frequency of 15 Hz and at high frequency of 100 Hz. When the input vibration is at low frequency of 15 Hz, as is clearly seen from an upper diagram of FIG. 7, if the diameter of the liquid pressure adjusting plate 13 is 76% or more of the inner diameter of the main chamber 5, the value of transfer function $G_2$ ($j\omega$) is −5 dB or less. That is, the flow resistance of the sub flow path 16 does not badly affect the damping effect of the low frequency vibration. When the input vibration is at high frequency of 100 Hz, as is clearly seen from a lower diagram of FIG. 7, if the diameter of the liquid pressure adjusting plate 13 is 95% or less of the inner diameter of the main chamber 5, the value of transfer function $G_2$ ($j\omega$) is −10 dB or more. That is, the sub flow path 16 is choked and the vibration of the liquid pressure adjusting plate 13 in the opposite phase to that of the input vibration cancels the disturbance force.

Consequently, the dimensions of the sub flow path 16 should preferably be determined so that the diameter of the liquid pressure adjusting plate 13 is about 76–95% of the inner diameter of the main chamber 5 as above described. Practically, this range is preferable when the inner diameter of the main chamber 5 is about 60–80mm.

Figure 8:
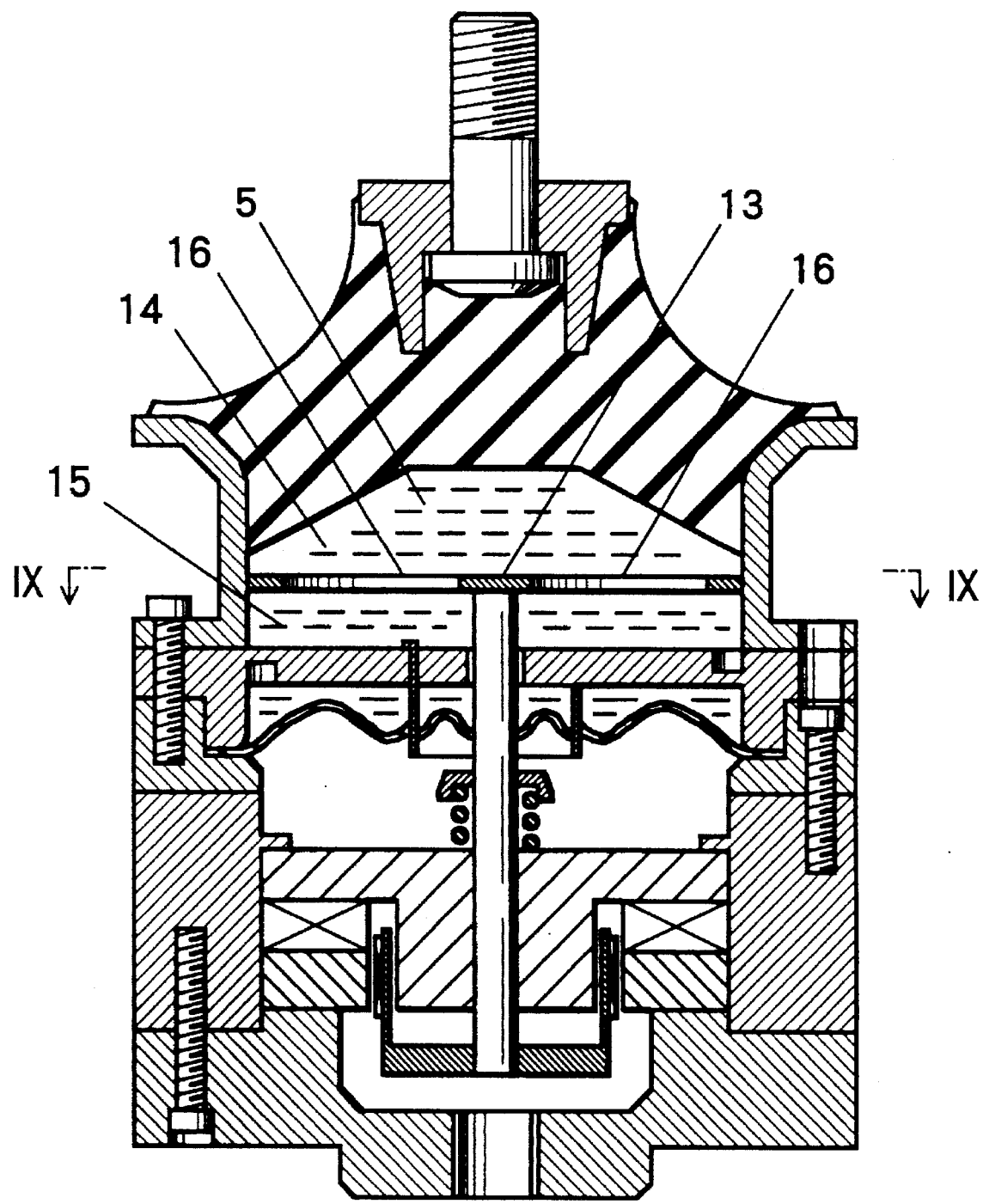
FIG. 8 is a longitudinal sectional front view of a liquid filled type vibration isolating device in a second embodiment.

Second Embodiment (FIG. 8 and FIG. 9)

In a liquid filled type vibration isolating device in this embodiment, a sub flow path 16 penetrates a liquid pressure adjusting plate 13, unlike the first embodiment in which it is provided between the circumferential wall of the main chamber 5 and the liquid pressure adjusting plate 13.

An outer circumferential surface of the liquid pressure adjusting plate 13 and an inner circumferential surface of a circumferential wall of the main chamber 5 are contacted as shown in FIG. 8 and FIG. 9, and the outer circumferential surface of the liquid pressure adjusting plate 13 vibrating up and down within the main chamber 5 is made of a material to reduce the frictional resistance with the circumferential wall of the main chamber 5. The sub flow path 16 penetrates the liquid pressure adjusting plate 13 so that a first chamber 14 communicates with a second chamber 15 through the sub flow path 16.

The number, shape and position of the sub flow path 16 may be arbitrary, but the dimensions of the sub flow path 16 is set so that when the whole circumferential length and the whole sectional area of the sub flow path 16 are expressed in mm and mm$^2$ respectively, the numerical value of the whole circumferential length is about 20–220% of the numerical value of the whole sectional area. Such dimensions of the sub flow path 16 are equivalent to that in the first embodiment. When the liquid pressure adjusting plate 13 is vibrated at high frequency of 100 Hz or more, the sub flow path 16 is choked.

This embodiment is the same as the first embodiment in other points.

Figure 10:
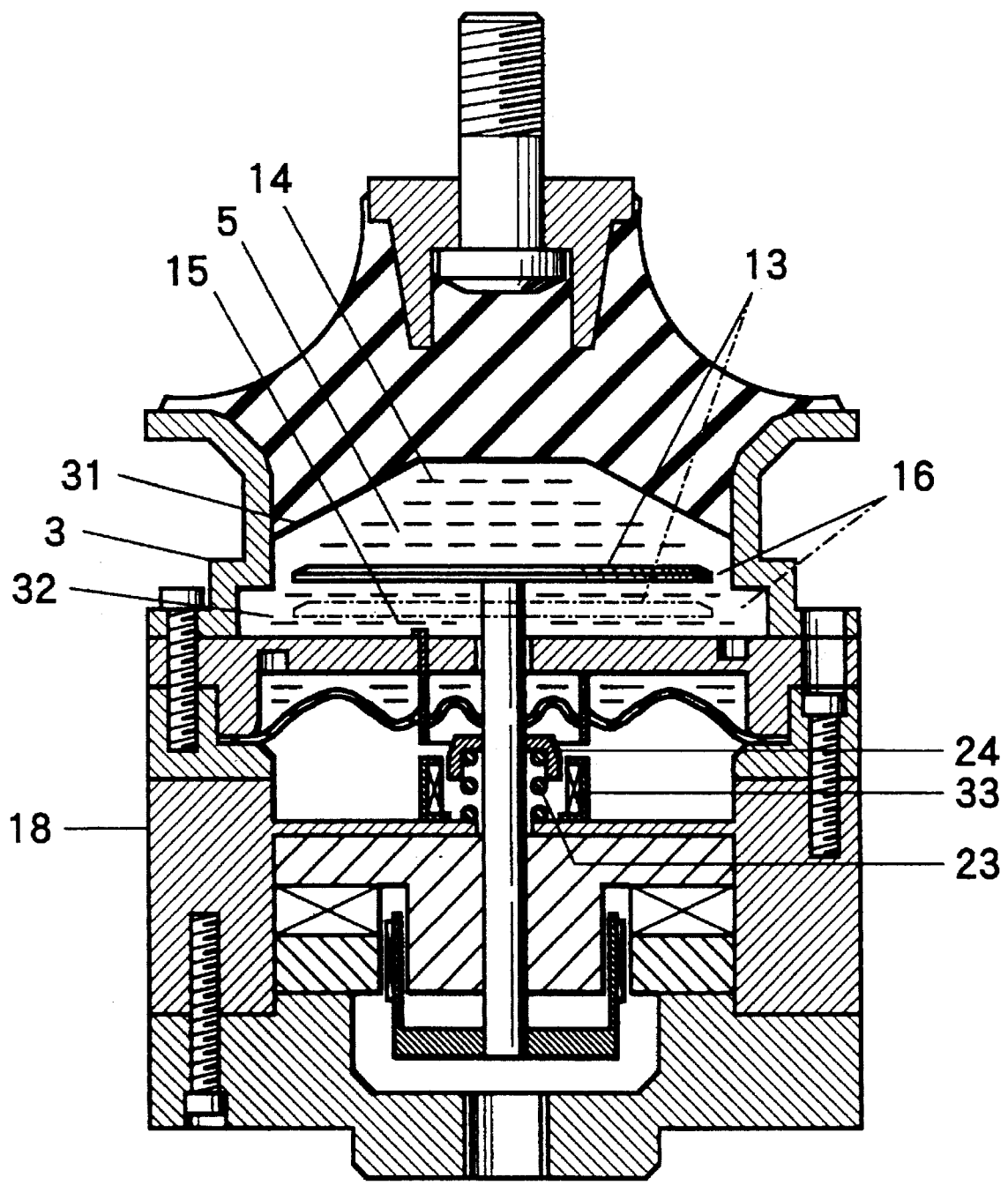
FIG. 10 is a longitudinal sectional front view of a liquid filled type vibration isolating device in a third embodiment.

Third Embodiment (FIG. 10)

In an liquid filled type vibration isolating device in this embodiment, the width of a sub flow path 16 is made wide when the input vibration is at low frequency, and narrow at high frequency, although it is constant in the first embodiment.

A cylindrical frame 3 constituting a circumferential wall of a main chamber 5 has a smaller diameter and a larger diameter as shown in FIG. 10, and the main chamber 5 has an upper smaller diameter part 31 and a lower larger diameter part 32. The movable parts such as a liquid pressure adjusting plate 13 can be moved upward and downward so that the liquid pressure adjusting plate 13 in a disk shape can be arranged either in the smaller diameter part 31 or the larger diameter part 32 of the main chamber 5. A solenoid 33 attracting downward a receiving ring 24 for a helical spring 23 for supporting the movable parts is fixed to a cylindrical member 18. The helical spring 23, the receiving ring 24 and the solenoid 33 constitute a liquid pressure adjusting plate moving device.

When the solenoid 33 is energized, the movable parts are moved downward against the helical spring 23 and the liquid pressure adjusting plate 13 is arranged in the larger diameter part 32 of the main chamber 5, so that the width of the sub flow path 16 in an annular shape through which a first chamber 14 communicates with a second chamber 15 becomes wide. When the solenoid 33 is deenergized, the movable parts are moved upward by the elastic force of the helical spring 23 and the liquid pressure adjusting plate 13 is arranged in the smaller diameter part 31 of the main chamber, so that the width of the sub flow path 16 becomes narrow.

When the input vibration is of low frequency, the liquid pressure adjusting plate 13 is arranged in the larger diameter part 32 of the main chamber 5 and the width of the sub flow path 16 is wide, so that the flow resistance of the flow path 16 is decreased and the liquid pressure adjusting plate 13 is not vibrated in the same manner as in the first embodiment. Since the width of the sub flow path 16 is wide, the flow resistance of the sub flow path 16 does not badly affect the damping effect of the low frequency vibration.

When the input vibration is of high frequency, the liquid pressure adjusting plate 13 is arranged in the smaller diameter part 31 of the main chamber 5 and the width of the sub flow path 16 is narrow, so that the flow resistance of the sub flow path 16 is increased and the liquid pressure adjusting plate 13 is vibrated in the opposite phase to that of the input vibration of high frequency in the same manner as in the first embodiment. If the input vibration is of high frequency of 100 Hz or more, the sub flow path 16 is choked.

This embodiment is the same as the first embodiment in other points.

Figure 11:
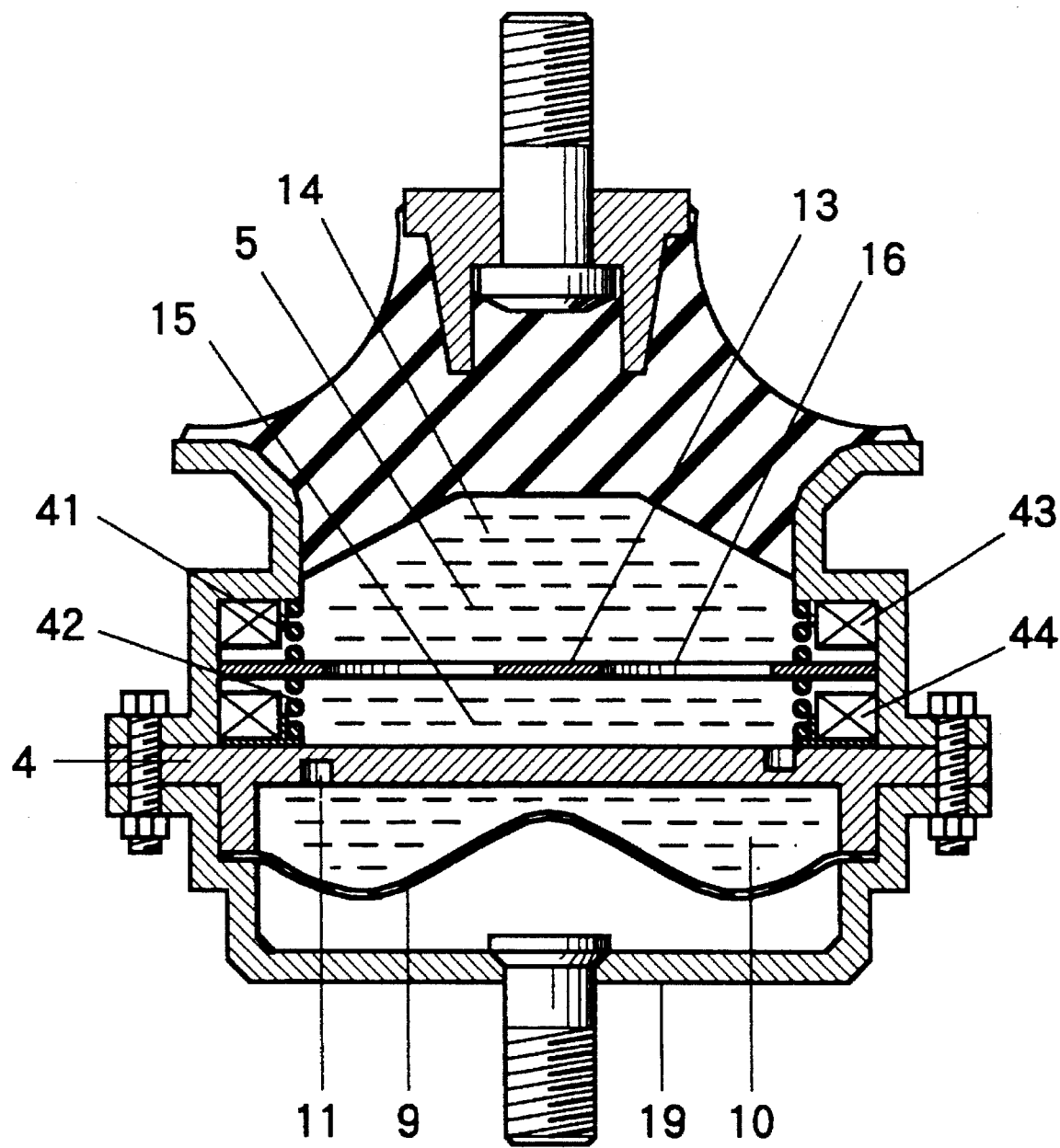
FIG. 11 is a longitudinal sectional front view of a liquid filled type vibration isolating device in a fourth embodiment.

Fourth Embodiment (FIG. 11)

In a liquid filled type vibration isolating device in this embodiment, an actuator for vibrating a liquid pressure adjusting plate 13 is arranged within a main chamber 5, not outside the main chamber 5 as in the first embodiment. A shaft 12, a receiving ring 24, a bobbin 25, a coil 26 and so forth vibrating together with the liquid pressure adjusting plate 13 are omitted in this embodiment.

An outer circumferential surface of the liquid pressure adjusting plate 13 and an inner circumferential surface of a circumferential wall of the main chamber 5 are contacted as shown in FIG. 11. The outer circumferential surface of the liquid pressure adjusting plate 13 vibrating up and down within the main chamber 5 is made of a material to reduce the frictional resistance with the circumferential wall of the main chamber 5. A sub flow path 16 penetrates the liquid pressure adjusting plate 13 and a first chamber 14 communicates with a second chamber 15 through the sub flow path 16.

The dimensions of the sub flow path 16 is set so that when the whole circumferential length and the whole sectional area of the sub flow path 16 are expressed in mm and mm$^2$ respectively, the numerical value of the whole circumferential length is about 20–220% of the numerical value of the whole sectional area in the same manner as in the second embodiment.

As shown in FIG. 11, a body mounting member 19 in a circular container shape with a bolt is fixed to a lower surface of a partition plate 4 constituting a bottom plate of the main chamber 5, and a peripheral portion of a second elastic member 9 of synthetic rubber in a curved annular membrane shape is held and fixed between a peripheral thick portion of the partition plate 4 and an inner circumferential step portion of the body mounting member 19. The partition plate 4 and the second elastic member 9 constitute a sub chamber 10. The second elastic member 9 and the body mounting member 19 constitute an air chamber.

A main flow path 11 penetrates the partition plate 4 circularly between the upper and lower surfaces of the partition plate 4. The main chamber 5 communicates with the sub chamber 10 by the main flow path 11 in the same manner as in the first embodiment.

In the actuator for vibrating the liquid pressure adjusting plate 13, as shown in FIG. 11, helical springs 41 and 42 with the same spring constant are fitted between an upper surface of a peripheral portion of the liquid pressure adjusting plate 13 and a spring receiving portion of an inner circumferential surface of the main chamber 5, and between a lower surface of a peripheral portion of the liquid pressure adjusting plate 13 and a spring receiving portion of an inner bottom surface of the main chamber 5, respectively. The upper and lower helical springs 41 and 42 support the liquid pressure adjusting plate 13. Solenoids 43 and 44 for attracting the liquid pressure adjusting plate 13 are fixed at the upper and lower positions of a peripheral portion of the liquid pressure adjusting plate 13 within the main chamber 5, respectively, and connected to a control device.

When the upper and lower solenoids 43 and 44 of the actuator are energized alternately by the control device, the liquid pressure adjusting plate 13 is vibrated up and down. A movable part vibrating up and down is only the liquid pressure adjusting plate 13, since its mass is little, the vibration drive is easily performed.

This embodiment is the same as in the first embodiment in other points.

Modifications

1) The vibration isolating device in the embodiments may be a mount for MacPherson type suspension system, a body mount of an automobile or a vibration isolating device in various devices other than an automobile.

2) The actuator for vibrating the liquid pressure adjusting plate may be an actuator utilizing hydraulics, pneumatics or an air-hydraulic system, or an actuator utilizing piezoelectricity.

3) The vibrometer 27 at the engine side may be a detector for detecting acceleration acting on the engine mounting member 2, the rotational speed and the combustion pressure of the engine E, or the like.

4) The vibrometer 28 at the body side may be a detector for detecting acceleration or load acting on the body mounting member 19, the sound pressure of the engine E, or the like.

5) The adaptive filter controller 29 may be a microcomputer for storing the optimum filter coefficient previously estimated by experiments in a map state and selecting the stored filter coefficient in response to the vibration state.

6) The liquid pressure adjusting plate moving device may be an actuator utilizing hydraulics, pneumatics or an air-hydraulic system.

What we claim is:

1. A liquid filled type vibration isolating device comprising:

a main chamber having a part of a wall constituted by a first elastic member to be deformed by input vibration and being filled with liquid;

a sub chamber having a part of a wall constituted by a second elastic member and being filled with liquid; a main flow path allowing the main chamber to communicate with the sub chamber;

a liquid pressure adjusting plate installed within the main chamber and dividing the main chamber into a first chamber and a second chamber and vibrating in an opposite phase to that of the input vibration; and a sub flow path allowing the first chamber to communicate with the second chamber and having dimensions such that the sub flow path is choked during high frequency vibration of the liquid pressure adjusting plate.

2. A vibration isolating device as set forth in claim 1, further comprising an actuator for vibrating the liquid pressure adjusting plate when the input vibration is of high frequency.

3. A vibration isolating device as set forth in claim 1, wherein the main chamber is in a circular sectional shape, and the liquid pressure adjusting plate is in a disk shape having a diameter smaller than the inner diameter of the main chamber, the main chamber and the liquid pressure adjusting plate are arranged concentrically, and the sub flow path is formed in an annular shape between a circumferential wall of the main chamber and the liquid pressure adjusting plate.

4. A vibration isolating device as set forth in claim 1, wherein the vibration isolating device is an engine mount of an automobile.

5. A vibration isolating device as set forth in claim 3, wherein when the inner diameter of the main chamber is about 60–80 mm, the diameter of the liquid pressure adjusting plate is set to about 76–95% of the inner diameter of the main chamber.

6. A vibration isolating device as set forth in claim 1, wherein an inner circumferential surface of the main chamber contacts an outer circumferential surface of the liquid pressure adjusting plate, and the sub flow path penetrates the liquid pressure adjusting plate.

7. A vibration isolating device as set forth in claim 6, further comprising an actuator for vibrating the liquid pressure adjusting plate when the input vibration is of high frequency.

8. A vibration isolating device as set forth in claim 6, wherein the vibration isolating device is an engine mount of an automobile.

9. A vibration isolating device as set forth in claim 6, wherein when a whole circumferential length and a whole sectional area of the sub flow path are expressed in mm and $mm^2$ respectively, the whole circumferential length is set to about 20–220% of the whole sectional area.

10. A vibration isolating device as set forth in claim 3, wherein the main chamber has a larger diameter part and a smaller diameter part so that the liquid pressure adjusting plate can be arranged either in the larger diameter part or the smaller diameter part, and a liquid pressure adjusting plate moving device is provided so that, when the input vibration is of low frequency, the liquid pressure adjusting plate is arranged in the larger diameter part of the main chamber and the width of the sub flow path is made wide, and when the input vibration is of high frequency, the liquid pressure adjusting plate is arranged in the smaller diameter part and the width of the sub flow path is made narrow.

11. A vibration isolating device as set forth in claim 10, further comprising an actuator for vibrating the liquid pressure adjusting plate when the input vibration is of high frequency.

12. A vibration isolating device as set forth in claim 10, wherein the vibration isolating device is an engine mount of an automobile.

13. A vibration isolating device as set forth in claim 7, wherein the actuator is installed within the main chamber.

14. A vibration isolating device as set forth in claim 13, wherein the vibration isolating device is an engine mount of an automobile.

15. A vibration isolating device as set forth in claim 13, wherein when a whole circumferential length and a whole sectional area of the sub flow path are expressed in mm and $mm^2$ respectively, the whole circumferential length is set to about 20–220% of the whole sectional area.

* * * * *